(12) United States Patent
Fu et al.

(10) Patent No.: US 6,796,426 B2
(45) Date of Patent: Sep. 28, 2004

(54) SLEEVES AND ALBUM PAGES FOR FLAT ITEMS

(75) Inventors: David Fu, Diamond Bar, CA (US); Robert D. Shipp, Bel-Air, CA (US)

(73) Assignee: Ultra Pro LP, City of Commerce, CA (US)

( * ) Notice: Subject to any disclaimer, the term of this patent is extended or adjusted under 35 U.S.C. 154(b) by 183 days.

(21) Appl. No.: 10/267,155

(22) Filed: Oct. 9, 2002

(65) Prior Publication Data

US 2003/0099504 A1 May 29, 2003

Related U.S. Application Data (60) Provisional application No. 60/340,742, filed on Nov. 29, 2001.

(51) Int. Cl.⁷ .............................................. B65D 85/57
(52) U.S. Cl. .................. 206/308.1; 206/312; 206/455; 206/459.5; 402/79; 281/38
(58) Field of Search .................. 206/232, 425, 206/308.1, 312, 313, 454, 455, 459.5; 402/79; 462/64; 281/38

(56) References Cited

U.S. PATENT DOCUMENTS

| | | |
|---|---|---|
| 875,545 A | 12/1907 | MacDonald |
| 1,360,836 A | 11/1920 | Wasisco |
| 1,691,049 A | 11/1928 | Douglas |
| 1,889,420 A | 11/1932 | Rubicam, Jr. |
| 1,988,998 A | 1/1935 | Cornish |
| 2,093,160 A | 9/1937 | Steinthal |
| D137,732 S | 4/1944 | Mitchell |
| 2,421,503 A | 6/1947 | Hermon |
| 2,621,785 A | 12/1952 | De Pace |
| 2,986,144 A | 5/1961 | Shepard |
| 3,091,046 A | 5/1963 | Engelstein et al. |
| 3,112,966 A | 12/1963 | Reid |
| 3,245,166 A | 4/1966 | Hagner |
| 3,555,713 A | 1/1971 | Leinbach |
| 3,596,393 A | 8/1971 | Lithgow |
| 3,651,591 A | 3/1972 | Woodyard |
| 3,956,836 A | 5/1976 | Seaborn |
| 4,247,999 A | 2/1981 | Latino |
| 4,356,649 A | 11/1982 | Diamond et al. |
| 4,405,228 A | 9/1983 | Muscoplat |
| 4,447,973 A | 5/1984 | Wihlke |
| 4,458,435 A | 7/1984 | Ackerman |
| 4,468,053 A | 8/1984 | Bradley |
| D282,856 S | 3/1986 | Daly |
| 4,640,413 A | 2/1987 | Kaplan et al. |
| 4,850,731 A | 7/1989 | Youngs |
| 4,907,904 A | 3/1990 | Baldwin |
| 4,965,948 A | 10/1990 | Ruebens |
| D321,007 S | 10/1991 | Barrick |
| 5,062,570 A | * 11/1991 | Ashby .................. 229/71 |
| 5,301,445 A | 4/1994 | Hoffmeister |
| 5,312,507 A | 5/1994 | Miller |
| D347,994 S | 6/1994 | Hammond |
| 5,389,437 A | 2/1995 | Miyajima et al. |
| 5,396,987 A | 3/1995 | Temple et al. |
| 5,411,134 A | 5/1995 | Temple et al. |
| 5,431,449 A | 7/1995 | Arimoto et al. |
| D360,800 S | 8/1995 | Temple et al. |
| 5,462,160 A | 10/1995 | Youngs |

(List continued on next page.)

FOREIGN PATENT DOCUMENTS

| | | |
|---|---|---|
| DE | 534428 | 9/1931 |
| FR | 332929 | 11/1903 |
| GB | 11790 | 6/1894 |
| GB | 29275 | 12/1897 |

*Primary Examiner*—Jacob K. Ackun, Jr.
(74) *Attorney, Agent, or Firm*—David Weiss (57) ABSTRACT

Double-sided sleeves and album pages for holding flat items such as compact discs or photographs, including an embedded synthetic paper strip with exposed write-on areas in respective positional association with the pockets of the sleeve or album page.

35 Claims, 3 Drawing Sheets

U.S. PATENT DOCUMENTS

| | | |
|---|---|---|
| 5,556,683 A | 9/1996 | Ranalli |
| 5,595,798 A | 1/1997 | Miller |
| D381,947 S | 8/1997 | Bergh et al. |
| 5,713,683 A | 2/1998 | Bergh et al. |
| 5,762,246 A | 6/1998 | Drew |
| D403,915 S | 1/1999 | Temple et al. |
| 5,882,038 A * | 3/1999 | Ong .......................... 281/31 |
| 6,065,599 A | 5/2000 | Lincoln |
| D434,262 S | 11/2000 | Bergh et al. |
| 6,186,320 B1 | 2/2001 | Drew |
| 6,241,086 B1 | 6/2001 | Bergh et al. |
| 6,247,587 B1 * | 6/2001 | Yu .......................... 206/308.1 |
| 6,266,907 B1 | 7/2001 | Matteau et al. |
| 6,267,234 B1 | 7/2001 | Bergh et al. |
| 6,309,987 B1 | 10/2001 | Srinivasan |
| 6,415,976 B1 * | 7/2002 | Flynn et al. .................. 229/71 |

* cited by examiner

SLEEVES AND ALBUM PAGES FOR FLAT ITEMS

CROSS-REFERENCE TO RELATED APPLICATION

This application claims the benefit of U.S. Provisional Patent Application No. 60/340,742, filed Nov. 29, 2001, which provisional application is incorporated herein by reference.

BACKGROUND OF THE INVENTION

This invention relates to sleeves and album pages for holding flat items such as compact discs and photographs, and more particularly to such sleeves and pages including a write-on capability.

Flexible plastic sleeves for holding a compact disc (or CD) are well known, as are flexible plastic album pages for holding photographs as well as CDs. Such sleeves and pages may be conventionally constructed of two or more rectangular superposed transparent flexible plastic sheets heat welded together along their edges and having an opening in one or both of the outermost sheets, creating a pocket into which the CD or photograph may be inserted through the opening.

Examples of such CD sleeves and album pages are disclosed in U.S. Pat. No. 6,186,320, to Terrence M. Drew, in which a sheet of heat weldable non-woven material is positioned between two transparent thermoplastic sheets, and the three superposed sheets are heat welded along their edges. An opening in each of the two outer sheets permits entry of a CD into a pocket between each transparent plastic sheet and the non-woven material. U.S. Pat. No. 6,186,320 is incorporated herein by reference.

A write-on capability may be provided for the sleeve or page. For example, U.S. Pat. No. 5,396,987, to James M. Temple et al., discloses a CD sleeve having two spaced-apart openings along the sleeve's top edge section for removably inserting an elongated alphanumeric/graphic card identifying a CD to be inserted into the pocket; U.S. Pat. No. 5,396,987 is incorporated herein by reference. Such insertable title strip appears to be shown also in FIG. 4 of the aforementioned Drew U.S. Pat. No. 6,186,320. Des. U.S. Pat. No. 434,262 to James A. Bergh et al., appears to show two write-on strips respectively overlying both sides of the top edge section of a CD sleeve and secured thereto.

SUMMARY OF THE INVENTION

The present invention provides a strip of a weldable synthetic paper, having a write-on capability, welded between the two outer flexible thermoplastic sheets of a double-sided sleeve or album page, each of the outer sheets being provided with a window exposing an area on each side of the strip for permitting access to a person for writing on the exposed area of the strip. The structure of the sleeve according to the present invention provides a lightweight, non-bulky double-sided sleeve with a permanently captive synthetic paper strip having exposed write-on areas in positional association with the respective pockets for permitting notation concerning the temporal contents of each such pocket. The portions of the outer sheets covering the unexposed areas of the strip protect such unexposed areas from damage and spoilage.

According to one aspect of the present invention, a sleeve is provided for holding flat items such as compact discs and photographs, comprising in combination: a flexible first sheet, a flexible second sheet, and a flexible third sheet interposed between the first and second sheets, the first, second and third sheets welded together to form a pocket between the first and third sheets including an opening in the first sheet for receiving a flat item, and to form a pocket between the second and third sheets including an opening in the second sheet for receiving a flat item; a synthetic paper strip interposed between and welded to the first and second sheets; a window through the first sheet exposing an area of the synthetic paper strip; and a window through the second sheet exposing an area of the synthetic paper strip. The three sheets and the synthetic paper strip are preferably of heat-weldable plastic, and the third sheet is preferably of a weldable, non-laminated, non-woven material.

The windows afford access to the exposed areas of the synthetic paper strip for being written upon, such as for identifying a flat item such as a compact disc or photograph which may be contained in the associated pocket. The windows are preferably in superposed relation, and the synthetic paper strip may be welded to the first and second sheets along the superposed windows.

The dimensions of the first sheet of the sleeve are substantially the same as the dimensions of the second sheet, while the third sheet has a height dimension less than the height dimension of the first sheet. The third sheet is welded along its top edge to and between the first and second sheets, and the synthetic paper strip is welded along its top lengthwise edge to the top edges of the first and second sheets. In preferred embodiments, the synthetic paper strip may be welded along its bottom lengthwise edge to the top edge of the third sheet, and the strip may also or alternatively be welded along its bottom edge to and between the first and second sheets.

According to another aspect of the present invention, an album page is provided for holding flat items such as compact discs or photographs, comprising in combination: a flexible first sheet, a flexible second sheet, and a flexible third sheet interposed between the first and second sheets, the three sheets welded together to form at least one pocket between the first and third sheets including an opening in the first sheet for receiving a flat item in each of the at least one pocket, and to form at least one other pocket between the second and third sheets including an opening in the second sheet for receiving a flat item in each of the at least one other pocket; a synthetic paper strip interposed between and welded to the first and second sheets adjacent to the pockets; at least one window through the first sheet exposing at least one area of the synthetic paper strip in respective positional association with the at least one pocket; at least one window through the second sheet exposing at least one area of the synthetic paper strip in respective positional association with the at least one other pocket.

The windows through the first sheet are preferably in superposed relation with the windows through the second sheet, respectively. Weld-seals may be provided along the superposed windows, welding the synthetic paper strip to the first and second sheets along the superposed windows.

BRIEF DESCRIPTION OF THE DRAWINGS

The novel features believed to be characteristic of the invention, together with further advantages thereof, will be better understood from the following description considered in connection with the accompanying drawings in which preferred embodiments of the present invention are illustrated by way of example. It is to be expressly understood, however, that the drawings are for the purpose of illustration and description only and are not intended as a definition of the limits of the invention.

DETAILED DESCRIPTION OF THE PREFERRED EMBODIMENTS

Figure 1A:
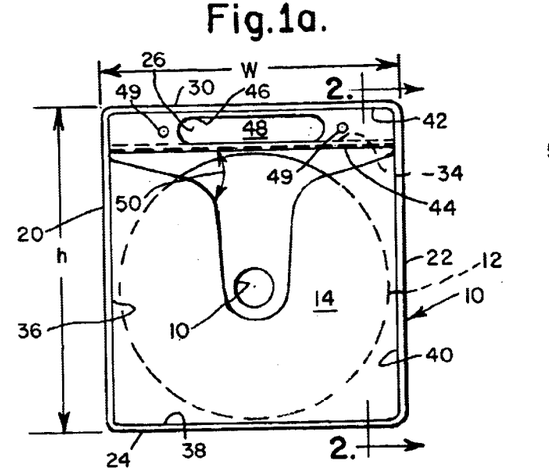
FIG. 1a is a front view of a preferred embodiment of a sleeve in accordance with the present invention for holding two flat items, in particular two compact discs, the rear view of this sleeve embodiment being substantially a mirror image of the front view.
Figure 1B:
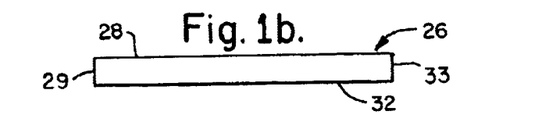
FIG. 1b is a front view of a synthetic paper strip shown in FIG. 1a, the rear view being substantially a mirror image of the front view.
Figure 2:
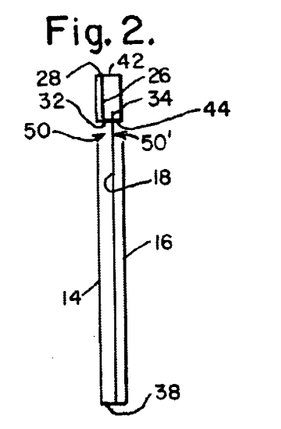
FIG. 2 is a cross-sectional schematic representation of the CD sleeve embodiment of FIG. 1a taken along the line 2—2 in the direction of the appended arrows.

Turning first to FIGS. 1a, 1b and 2, there is shown a preferred embodiment of a sleeve 10 according to the present invention, for holding two compact discs or CDs 12 (one of which is shown in FIG. 1 only). The CD sleeve 10 includes a first or front substantially rectangular, flexible, transparent plastic sheet 14, and a second or rear substantially rectangular, flexible, transparent plastic sheet 16, each preferably of a polyolefin material such as polypropylene. Both sheets 14 and 16 are of substantially the same height h (as viewed in the drawing of FIG. 1a) and of substantially the same width w. Interposed between the two transparent sheets 14, 16 is a sheet of non-woven material 18, preferably of a polyolefin material such as polypropylene, such as the single non-laminated sheet of non-woven material described in U.S. Pat. No. 6,186,320 (incorporated herein by reference) as having the trade name of VERATEC®, or the spunbond polypropylene manufactured by BB Nonwovens (of Simpsonville, S.C.) and marketed under the VERASPUN trademark.

The width of the non-woven material sheet 18 is substantially the same as the width w of the first and second transparent sheets 14, 16, and the height of the non-woven sheet 18 is slightly less than (for example by approximately one-half inch) the height h of the transparent sheets 14, 16 but slightly greater than the height dimension of the flat item, in this case such height dimension being the diameter of the CD 12. The three sheets 14, 18, 16 are situated in superposed relation with the non-woven sheet 18 sandwiched between the two transparent sheets 14, 16, and with the respective left edges (as viewed in the drawing of FIG. 1) of all three sheets in substantial alignment, the respective right edges of all three sheets in substantial alignment, and the respective bottom edges of all three sheets in substantial alignment, to respectively form a left edge 20 of the CD sleeve 10, a right edge 22 of the CD sleeve 10, and a bottom edge 24 of the CD sleeve 10. The three sheets 14, 18, 16, each being of thermoplastic material, are heat-welded along such edges as later described.

The write-on capability of the present invention is provided by a strip of synthetic paper upon which indicia may be applied by pen or pencil, and upon which indicia may be printed by conventional printing techniques such as silk screening. The term "synthetic paper" is used to identify a heat weldable sheet material that may be written or printed upon. One example of a synthetic paper comprises an opaque polyolefin-based synthetic paper, preferably consisting of polypropylene and filler material such as calcium carbonate, titanium dioxide and talc. Synthetic papers are well known in the art and commercially available, and one such type suitable for the present invention consists of approximately 60% polypropylene and 40% filler material. The polypropylene component permits heat-sealing, while the filler component permits the synthetic paper to be written upon.

The CD sleeve 10 includes a strip of such heat weldable synthetic paper 26 having a length which is substantially the same as the width w of each of the three sheets 14, 18, 16, and a height slightly greater than the difference between the height h of the sheets 14, 16 and the height of the non-woven sheet 18. As shown more clearly in FIG. 1b, the synthetic paper strip 26 includes a top lengthwise edge 28, a bottom lenthwise edge 32, a left edge or end 29, and a right edge or end 33. The synthetic paper strip 26 is interposed between the first and second transparent sheets 14, 16 such that the synthetic paper strip's top edge 28 is substantially aligned with the top edges of the transparent sheets 14, 16 (i.e. along the top edge 30 of the CD sleeve 10), and—in the embodiment where the strip 26 is greater than the difference between the height of the first sheet 14 and the height of the third sheet 18—with a lengthwise section adjacent to the strip's bottom edge 32 overlapping a corresponding widthwise section along the non-woven sheet's top edge 34.

The CD sleeve embodiment 10 is fabricated by using thermoplastic welding techniques to produce weld-seals welding together the three sheets 14, 18, 16 and the synthetic paper strip 26 as shown in FIGS. 1a and 2. Specifically, with the sheets 14, 18, 16 and strip 26 situated as previously described and shown, a left weld-seal 36 welds together the left edges of the sheets 14, 18, 16 and strip 26 to form the left edge 20 of the CD sleeve 10, a bottom weld-seal 38 welds together the bottom edges of sheets 14, 18, 16 to form the bottom edge 24 of the CD sleeve 10, a right weld-seal 40 welds together the right edges of the sheets 14, 18, 16 and strip 26 to form the right edge 22 of the CD sleeve 10, and a top weld-seal 42 welds together the top edges of the two transparent sheets 14, 16 and the top edge 28 of the synthetic paper strip 26 interposed between the two transparent sheets 14, 16 to form the top edge 30 of the CD sleeve 10. In the preferred embodiment of FIG. 1a, an intermediate weld-seal 44 welds together the first transparent sheet 14, the bottom lengthwise edge 32 of the synthetic paper strip 26, the top edge 34 of the non-woven sheet 18, and the second transparent sheet 16.

An opening or window 46 (see FIG. 1) through the front transparent sheet 14 between the top weld-seal 42 and the intermediate weld-seal 44 exposes an area 48 of the front surface of the synthetic paper strip 26. Similarly, another opening or window similar to the window 46 extends through the rear transparent sheet 16 between the top weld-seal 42 and the intermediate weld-seal 44, to expose an area of the reverse or rear surface of the synthetic paper 26 similar to the area 48. The two windows 46 through the two outer sheets 14, 16 are preferably in superposed relation. The synthetic paper strip 26 is held permanently captive between the two transparent sheets 14, 16 by the weld-seals 36, 42, 40, 44, and except for the exposed areas 48 within the windows 46 the strip 26 is embedded between the transparent sheets 14, 16. Additional securement of the strip 26 to the outer sheets 14, 16 in the vicinity of the window 46 may be provided by an additional weld on each side of the window, such as the two spaced-apart spot welds 49 along the strip 26 welding together the synthetic paper strip 26 and the first and second sheets 14, 16 on either side of the superposed windows 26. The exposed areas 48 on each surface of the synthetic paper strip 26 are accessible for being written or printed upon by ink, pencil or otherwise. The writing or message, if in pencil, may be erased for being again written or printed upon. The portions of the sheets 14, 16 covering the unexposed areas of the strip 26 protect such unexposed areas from damage and soilage.

A CD opening 50 downwardly extends from just below the horizontal intermediate weld-seal 44, extending across substantially the width w of the first transparent sheet 14, and permits a CD 12 to be inserted into the pocket formed between the first sheet 14 and the non-woven sheet 18, as shown in FIG. 1a. Similarly, a second CD opening 50' (see FIG. 2) through the second transparent sheet 16 permits another CD to be inserted into the pocket formed between the second transparent sheet 16 and the non-woven sheet 18. Other configurations of the CD opening 50 are possible, many of which are known in the CD sleeve art.

The CD sleeve 10 may be fabricated by techniques well known in the plastics fabrication art. The weld-seals 36, 38, 40, 42, 44 are produced by well-known thermal welding techniques. Although other weld-compatible thermoplastic materials may be used, polypropylene is a preferred material for the transparent sheets 14, 16 as well as for the non-woven sheet 18 and the synthetic paper strip 26, and the weld-seals may be produced by such processes as conventional ultrasonic welding, or by thermocontact welding such as taught in U.S. Pat. No. 5,312,507 incorporated herein by reference. The creation of the windows 46 and of the CD pocket openings 50, 50', may be produced by punch or notching techniques well known in the plastics fabrication art.

The intermediate weld 44 is shown in FIG. 1 as being intermittent (i.e. a series of welded dashes) rather than as a solid or continuous seal, although a solid or continuous seal may alternatively be used for the intermediate weld-seal. Similarly, the solid or continuous weld-seals 36, 38, 40, 48 shown in FIG. 1 may alternatively be intermittent weld-seals.

In one example of a CD sleeve 10, the height h of the CD sleeve was approximately 5⅝ inches, the width w of the CD sleeve 10 was approximately 5 inches, the height of the non-woven sheet 18 was approximately 5⅛ inches, the height of the strip 26 was approximately ⅝ inch, and each window 46 was approximately 2½ inches in length and approximately ⅜ inches in height. In that example, the non-woven polypropylene sheet 18 was of 2.0-ounce weight, the synthetic paper strip 26 was 135-micron polypropylene-based, and each of two transparent sheets 14, 16 was 140-micron clear orange peel polypropylene.

Figure 3:
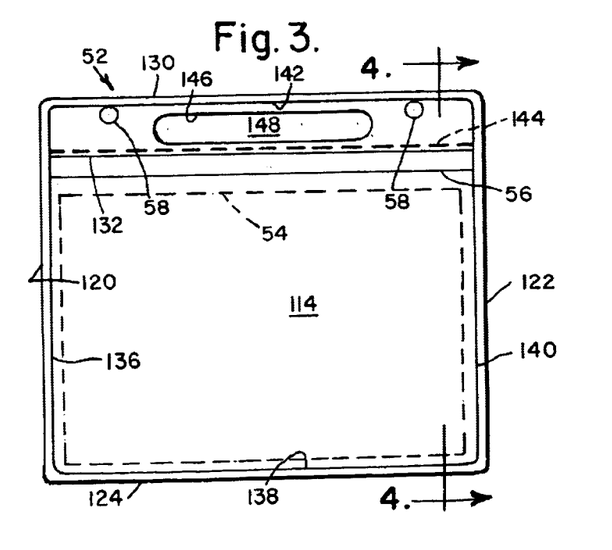
FIG. 3 is a front view of a preferred embodiment of an album page for holding two flat items, in particular two photographs or other sheet material, in accordance with the present invention, the rear view of this album page embodiment being substantially a mirror image of the front view.
Figure 4:
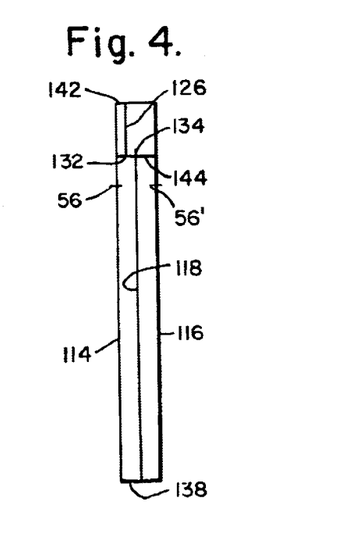
FIG. 4 is a cross-sectional schematic representation of the album page embodiment of FIG. 3 taken along the line 4—4 in the direction of the appended arrows.

FIGS. 3 and 4 show a first preferred embodiment of an album page 52 for holding two photographic prints 54, which album page is related in materials, structure and fabrication to the CD sleeve of FIG. 1. Accordingly, like reference numerals are employed in FIGS. 3 and 4 for like components in FIGS. 1 and 2; however, such like reference numerals in FIGS. 3 and 4 are augmented by 100 relative to their two-digit counterparts in FIGS. 1 and 2 (e.g., 126 instead of 26).

Accordingly, the album page 52 includes a first or front substantially rectangular, flexible, transparent plastic sheet 114, and a second or rear substantially rectangular, flexible, transparent plastic sheet 116, each preferably of a polyolefin material such as polypropylene. Both sheets 114 and 116 are of substantially the same height (as viewed in the drawing of FIG. 3) and of substantially the same width. Interposed between the two transparent sheets 114, 116 is a sheet of non-woven material 118 as previously described, preferably of a polyolefin such as polypropylene.

The width of the non-woven sheet 118 is substantially the same as the width of the first and second transparent sheets 114, 116, and the height of the non-woven sheet 118 is slightly less than the height of the transparent sheets 114, 116, but greater than the height of a photograph 54 (shown in phantom in FIG. 3, but not shown in FIG. 4) which each pocket of the double-sided album page 52 is to contain. The three sheets 114, 118, 116 are situated in superposed relation with the non-woven sheet 118 sandwiched between the two transparent sheets 114, 116, and with the respective left edges (as viewed in the drawing of FIG. 3) of all three sheets in substantial alignment, the respective right edges of all three sheets in substantial alignment, and the respective bottom edges of all three sheets in substantial alignment, to respectively form a left edge 120 of the album page 52, a right edge 122 of the album page 52, and a bottom edge 124 of the album page 52. The three sheets 114, 118, 116, each being of thermoplastic material, are heat-welded along such edges as previously described in connection with the fabrication of the CD sleeve 10.

Similarly to the structure of the CD sleeve 10, the album page 52 includes a strip of heat weldable synthetic paper having a write-on capability, as described above. The synthetic paper strip 126 has a length which is substantially the same as the width of the three sheets 114, 118, 116, and a height slightly greater than the difference between the height of the sheets 114, 116 and the height of the non-woven sheet 118. The synthetic paper strip 126 is interposed between the first and second transparent sheets 114, 116 such that the synthetic paper strip's top edge 128 is substantially aligned with the top edges of the transparent sheets 114, 116 (i.e. along the top edge 130 of the album page 52), and with a lengthwise section adjacent to the strip's bottom edge 132 overlapping a corresponding widthwise section along the non-woven sheet's top edge 134.

The album page 52 is fabricated by using thermoplastic welding techniques, as described above, to produce weld-seals welding together the various sheets 114, 118, 116 and the synthetic paper strip 126 as shown in FIGS. 3 and 4. Specifically, with the sheets 114, 118, 116 and strip 126 situated as previously described and shown, a left weld-seal 136 welds together the left edges of the sheets 114, 118, 116 and strip 126 to form the left edge 120 of the album page 52, a bottom weld-seal 138 welds together the bottom edges of sheets 114, 118, 116 and strip 126 to form the bottom edge 124 of the album page 52, a right weld-seal 140 welds together the right edges of the sheets 114, 118, 116 to form the right edge 122 of the album page 52, and a top weld-seal 142 welds together the top edges of the two transparent sheets 114, 116 and the top edge 128 of the synthetic paper strip 126 interposed between the two transparent sheets 114, 116 to form the top edge 130 of the album page 52. An intermediate weld-seal 144 welds together the first transparent sheet 114, the lengthwise section near the bottom edge 132 of the synthetic paper strip 126, the top edge 134 of the non-woven sheet 118, and the second transparent sheet 116.

An opening or window 146 (see FIG. 3) through the front transparent sheet 114 between the top weld-seal 142 and the intermediate weld-seal 144 exposes an area 148 of the front surface of the synthetic paper strip 126. Similarly, another opening or window similar to the window 146 extends through the rear transparent sheet 116 between the top weld-seal 142 and the intermediate weld-seal 144, to expose an area of the reverse or rear side of the synthetic paper strip 126 similar to the area 148. The synthetic paper strip 126 is held captive between the two transparent sheets 114, 116, by the weld-seals 136, 142, 140, 144, and except for the exposed areas 148 within the windows 146 the strip 126 is embedded between the transparent sheets 114, 116. The exposed areas 148 on each side of the synthetic paper strip 126 are accessible for being written or printed upon by ink, pencil or otherwise, such as a message relating to a photo print inserted in the corresponding pocket. If in pencil, the message may be erased for applying a different message as desired. The portions of the sheets 114, 116 covering the unexposed areas of the strip 126 protect such unexposed areas from damage and soilage.

An opening such as a slit 56 is cut through the first transparent sheet 114 for permitting a photograph 54 to be inserted through the slit opening 56 and into the pocket formed between the first sheet 114 and the non-woven sheet 118, as indicated in FIG. 3. The slit opening 56 may be situated just below the bottom edge 132 of the synthetic paper strip 126 and extend horizontally substantially the width of the first transparent sheet 114 as shown in FIG. 3 and schematically represented in FIG. 4, or the slit opening 56 may be vertically disposed for its loading of the photograph. Similarly, a second slit opening 56' (showed schematically in FIG. 4) through the rear transparent sheet 116 permits another photographic print to be inserted into the pocket formed between the second transparent sheet 116 and the non-woven sheet 118.

The album page 52 is adapted for being secured or held by a binder, such as by apertures spaced along one of the edges of the album page 52 for cooperation with rings of a loose-leaf album cover, for example by the apertures 58 through the two transparent sheets 114, 116 and the interposed synthetic paper strip 126 spaced along and adjacent to the album page's top edge 130. Similar provision may be implemented for adapting the CD sleeve 10 of FIG. 1 for being secured or held by a binder including a loose-leaf album cover.

It may be appreciated that, although the album page 52 is oriented in FIGS. 3 and 4 such that the synthetic paper strip 126 is shown along the page's top edge 130 (i.e. horizontally as viewed in the drawing of FIG. 3), in actual use the page may be rotated 90° in the plane of the drawing so that the synthetic paper strip 126 may be considered to be along a side edge (i.e. vertically as viewed in the drawing of FIG. 3) of the page 52 when held by an album cover or binder. Such appreciation applies as well to the album pages shown in FIGS. 5–8.

Figure 5:
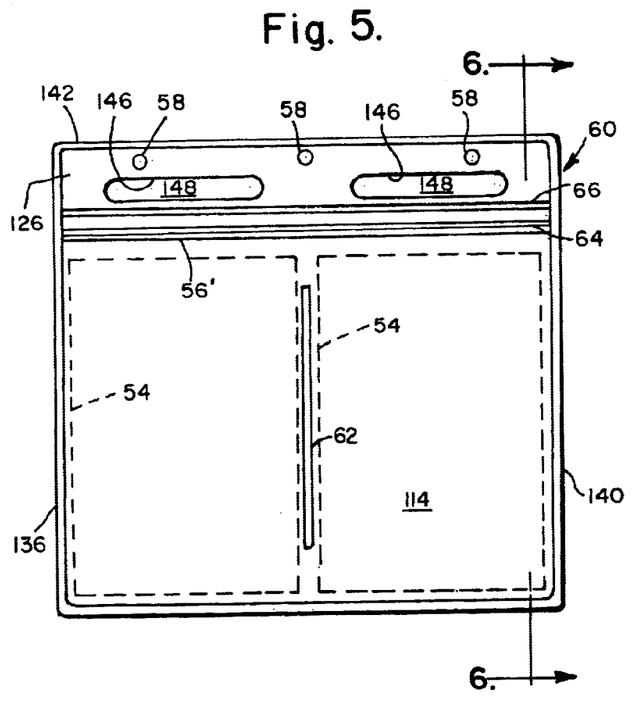
FIG. 5 is a front view of a preferred embodiment of an album page for holding four photographs or other flat items, in accordance with the present invention, the rear view of this album page embodiment being substantially a mirror image of the front view.
Figure 6:
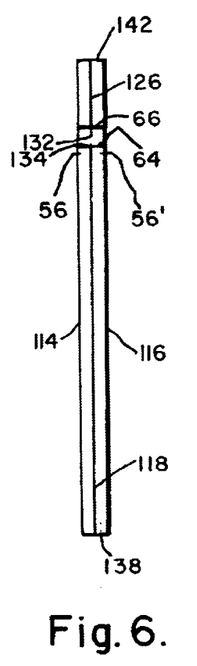
FIG. 6 is a cross-sectional schematic representation of the album page embodiment of FIG. 5, taken along the line 6—6 in the direction of the appended arrows.

FIGS. 5 and 6 show a second preferred embodiment of an album page 60 for holding four photographic prints 54, which album page is similar in materials and fabrication to the album page 52 of FIGS. 3 and 4, and except as described below is similar in structure to the album page of FIGS. 3 and 4. Accordingly, like reference numerals are employed in FIGS. 5 and 6 for like components in FIGS. 3 and 4.

The album page 60 includes two pockets between the first transparent sheet 114 and the non-woven sheet 118, each for holding a photographic print 54 (see FIG. 5) and separated by a vertical weld-seal 62 midway between the left and right edge weld-seals 136, 140, each pocket having an opening formed by the slit 56 horizontally situated just below the non-woven sheet's top edge 134 and the synthetic paper strip's bottom edge 132. Specifically, as shown in FIGS. 5 and 6, the slit opening 56 is situated just below the first intermediate weld-seal 64 welding the top edge 134 of the non-woven sheet 118 to the two transparent sheets 114, 116. In this embodiment, the height of the synthetic paper strip 126 is less than the difference between the height of the first sheet 114 and the height of the third sheet 118, so that the bottom lengthwise edge 132 of the strip 126 is not welded to the top edge of the third sheet 118 by the first intermediate weld-seal 64. Instead, the bottom lengthwise edge 132 of the synthetic paper strip 126 is welded to and between the two transparent sheets 114, 116 by a second intermediate weld-seal 66 parallel to and just above the first intermediate weld-seal 64 and spaced therefrom (such as by one-sixteenth inch). This dual intermediate weld-seal arrangement 64, 66 may be utilized as well for compact disc sleeves in accordance with the present invention; e.g. the embodiment of FIGS. 1 and 2 may be modified in accordance with the dual-intermediate weld-seal arrangement of FIGS. 5 and 6.

A second slit opening 56' (shown schematically in FIG. 6) through the second or rear transparent sheet 116 permits two additional photographic prints to be inserted into the two pockets separated by the weld-seal 62 and formed between the second transparent sheet 116 and the non-woven sheet 118.

Each of the four pockets has its own write-on area adjacent thereto, specifically a window 146 through the front transparent sheet 114 between the top weld-seal 142 and the second intermediate weld-seal 66, exposing respective areas 148 of the front surface of the synthetic paper strip 126 in positional association with the respective pockets. Similarly, other openings or windows similar to the window 146 extend through the rear transparent sheet 116 between the top weld-seal 142 and the second intermediate weld-seal 66, expose areas of the reverse or rear surface of the synthetic paper strip 126 similar to the areas 148 and respectively in positional association with the two pockets formed between the second transparent sheet 116 and the non-woven sheet 118. The synthetic paper strip 126 is held captive between the two transparent sheets 114, 116 by the weld-seals 136, 142, 140, 66, and except for the exposed areas 148 within the windows 146 the strip 126 is embedded between the transparent sheets 114, 116, such embedded areas being protected from damage and soilage. The exposed areas 148 on each side of the synthetic paper strip 126 are accessible for being written or printed upon by ink, pencil or otherwise.

Figure 7:
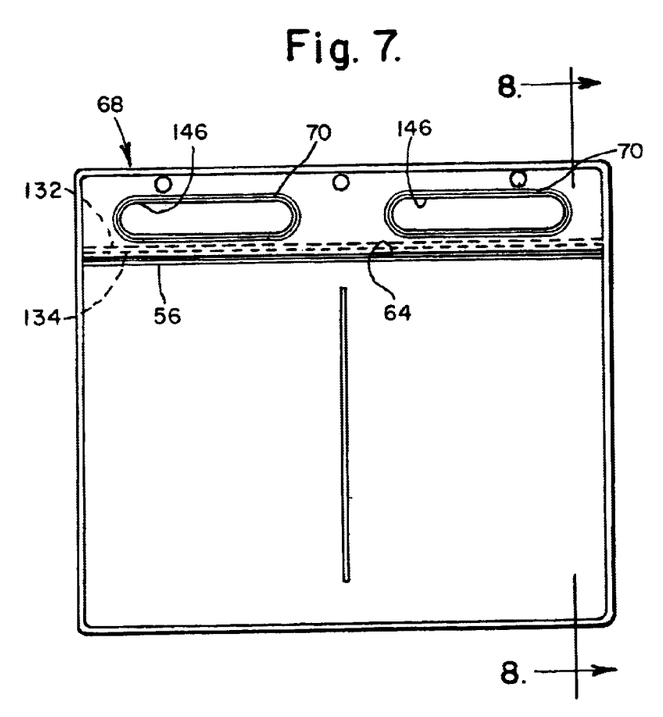
FIG. 7 is a front view of an alternative embodiment of an album page similar to the embodiment of FIG. 4 but showing an alternative weld-seal configuration, the rear view of this album page embodiment being substantially a mirror image of the front view.
Figure 8:
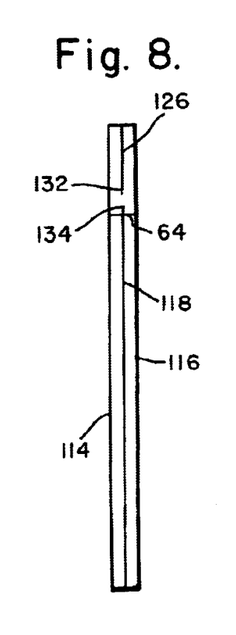
FIG. 8 is a cross-sectional schematic representation of the album page embodiment of FIG. 7 taken along the line 8—8 in the direction of the appended arrows.

A modification of the album page embodiment of FIGS. 5 and 6 is shown in FIGS. 7 and 8, in which the second intermediate weld-seal 66 of FIG. 5 does not extend across the entire width of the bottom edge 132 of the synthetic paper strip 126. Instead, in the album page embodiment 68 of FIGS. 7 and 8, sections of the synthetic paper strip 126 adjacent its bottom edge 132 are welded to and between the two transparent sheets 114, 116 by respective window weld-seals 70 extending along the bottom edge of each of the windows 146 and preferably extending about the entire perimeter of each of the windows 146. Such window weld-seals 70 are applicable as well to the compact disc sleeve embodiment of FIG. 1. In the preferred embodiments where a window through the first sheet is in superposed relation with a window through the second sheet, each weld-seal 70 welds the synthetic paper strip to the first and second sheets about both superposed windows.

In one example of a photographic album page 68, the non-woven polypropylene sheet 118 was of 2.0-ounce weight, the synthetic paper strip 126 was 135-micron white polypropylene, and each of the two transparent sheets 114, 116 was 115-micron clear polypropylene. Each of the pockets in this example was 4 3/16 inches in width and 6 1/8 inches in height, suitable for holding photo prints up to 4 inches by 6 inches in dimensions. Such dimensions and material properties are applicable as well to an example of the album page 60 of FIGS. 5 and 6.

Thus, there have been described preferred embodiments of sleeves and album pages for holding flat items, in particular for holding compact discs or photographs, in which an embedded synthetic paper strip includes exposed write-on areas in positional association with the respective pockets of the sleeve or album page. Other embodiments of the present invention, and variations of the embodiments described herein, may be developed without departing from the essential characteristics thereof. For example, compact disc sleeve embodiments of non-rectangular configuration, such as a compact disc sleeve where the lower approximately one-half of the sleeve is of semicircular rather than of rectangular configuration, are included within the present invention. Accordingly, the invention should be limited only by the scope of the claims listed below.

We claim:

1. A sleeve for holding flat items, comprising in combination:
   a flexible first sheet, a flexible second sheet, and a flexible third sheet interposed between said first and second sheets, said first, second and third sheets welded together to form a pocket between said first and third sheets including an opening in said first sheet for receiving a flat item, and to form a pocket between said second and third sheets including an opening in said second sheet for receiving a flat item;
   a synthetic paper strip interposed between and welded to said first and second sheets;
   a window through said first sheet exposing an area of said synthetic paper strip; and
   a window through said second sheet exposing an area of said synthetic paper strip.

2. The sleeve according to claim 1, wherein:
   said third sheet comprises a sheet of non-woven material.

3. The sleeve according to claim 1, wherein:
   said windows afford access to the exposed areas of said synthetic paper strip for being written upon.

4. The sleeve according to claim 1, wherein:
   said windows are in superposed relation.

5. The sleeve according to claim 4, including:
   two spaced-apart welds along said synthetic paper strip welding together said synthetic paper strip and said first and second sheets on either side of said windows.

6. The sleeve according to claim 4, including:
   weld seals about said windows welding together said first and second sheets to said synthetic paper strip.

7. The sleeve according to claim 1, wherein:
   the flat items for being held by said sleeve are compact discs.

8. The sleeve according to claim 1, wherein:
   the flat items for being held by said sleeve are photographs.

9. The sleeve according to claim 1, wherein:
   the dimensions of said first sheet are substantially the same as the dimensions of said second sheet;
   said third sheet has a height dimension less than the height dimension of said first sheet, and said third sheet is welded along its top edge to said first and second sheets; and
   said synthetic paper strip is welded along its top lengthwise edge to the top edges of said first and second sheets.

10. The sleeve according to claim 9, wherein:
    said synthetic paper strip is welded along its bottom lengthwise edge to said first and second sheets.

11. The sleeve according to claim 9, wherein:
    said synthetic paper strip is welded along its bottom lengthwise edge to said top edge of said third sheet.

12. The sleeve according to claim 9, wherein:
    said synthetic paper strip is welded along each of its ends to said first and second sheets.

13. The sleeve according to claim 9, wherein:
    said synthetic paper strip is welded along said windows to said first and second sheets.

14. A sleeve for holding flat items, comprising in combination:
    a flexible first sheet having a top edge, a bottom edge and two side edges;
    a flexible second sheet having a top edge, a bottom edge and two side edges, said second sheet having dimensions substantially the same as the dimensions of said first sheet;
    a flexible third sheet having a top edge, a bottom edge and two side edges, said third sheet having a width dimension substantially the same as the width dimension of said first and second sheets, said third sheet having a height dimension less than the height dimension of said first and second sheets and greater than the height dimension of a flat item, said third sheet interposed between said first and second sheets with said side edges and said bottom edges welded respectively together and with said top edge of said third sheet welded to said first and second sheets;
    a synthetic paper strip having a length dimension substantially equal to the width dimension of said first, second and third sheets, said synthetic paper strip interposed between said first and second sheets with the top lengthwise edge of said synthetic paper strip welded to said top edges of said first and second sheets;
    a window through said first sheet exposing an area of said synthetic paper strip;
    a window through said second sheet exposing an area of said synthetic paper strip; and
    an opening in said first sheet for receiving a flat item between said first sheet and said third sheet, and an opening in said second sheet for receiving a flat item between said second sheet and said third sheet.

15. The sleeve according to claim 14, wherein:
    said third sheet comprises a sheet of non-woven material.

16. The sleeve according to claim 14, wherein:
said windows afford access to the exposed areas of said synthetic paper strip for being written upon.

17. The sleeve according to claim 14, wherein:
said windows are in superposed relation.

18. The sleeve according to claim 17, including:
two spaced-apart welds along said synthetic paper strip welding together said synthetic paper strip and said first and second sheets on either side of said windows.

19. The sleeve according to claim 17, including:
weld seals about said windows welding together said first and second sheets to said synthetic paper strip.

20. The sleeve according to claim 14, wherein:
the flat items for being held by said sleeve are compact discs.

21. The sleeve according to claim 14, wherein:
the flat items for being held by said sleeve are photographic prints.

22. The sleeve according to claim 14, wherein:
said height dimension of said synthetic paper strip is greater than the difference between the height dimension of said first sheet and the height dimension of said third sheet; and
said synthetic paper strip is welded along its bottom lengthwise edge to said top edge of said third sheet.

23. The sleeve according to claim 14, wherein:
said height dimension of said synthetic paper strip is less than the difference between the height dimension of said first sheet and the height dimension of said third sheet; and
said synthetic paper strip is welded along its bottom lengthwise edge to said first and second sheets.

24. The sleeve according to claim 14, wherein:
said synthetic paper strip is welded along each of its ends to said first and second sheets.

25. The sleeve according to claim 14, wherein:
said synthetic paper strip is welded to said first and second sheets along said windows.

26. An album page for holding flat items, comprising in combination:
a flexible first sheet, a flexible second sheet, and a flexible third sheet interposed between said first and second sheets, said first, second and third sheets welded together to form at least one pocket between said first and third sheets including an opening in said first sheet for receiving a flat item in each of said at least one pocket, and to form at least one other pocket between said second and third sheets including an opening in said second sheet for receiving a flat item in each of said at least one other pocket;
a synthetic paper strip interposed between and welded to said first and second sheets adjacent to said at least one pocket;
at least one window through said first sheet exposing at least one area of said synthetic paper strip in respective positional association with said at least one other pocket; and
at least one window through said second sheet exposing at least one area of said synthetic paper strip in respective positional association with said at least one other pocket.

27. The album page according to claim 26, wherein:
said third sheet comprises a sheet of non-woven material.

28. The album page according to claim 26, wherein:
said windows through said front sheet are in superposed relation with said windows through said second sheet, respectively.

29. The album page according to claim 26, including:
weld-seals along said windows welding said synthetic paper strip to said first and second sheets.

30. An album page for holding flat items, comprising in combination:
a flexible first sheet having a top edge, a bottom edge and two side edges;
a flexible second sheet having a top edge, a bottom edge and two side edges, said second sheet having dimensions substantially the same as the dimensions of said first sheet;
a flexible third sheet having a top edge, a bottom edge and two side edges, said third sheet having a width dimension substantially the same as the width dimension of said first and second sheets, said third sheet having a height dimension less than the height dimension of said first and second sheets and greater than the height dimension of a flat item;
said third sheet interposed between said first and second sheets and welded together along at least said side edges and said bottom edges to form at least one pocket between said first and third sheets including an opening in said first sheet for receiving a flat item in each of said at least one pocket, and to form at least one other pocket between said second and third sheets including an opening in said second sheet for receiving a flat item in each of said at least one other pocket;
a synthetic paper strip having a length dimension substantially equal to the width dimension of said first, second and third sheets, said synthetic paper strip interposed between said first and second sheets with the top lengthwise edge of said synthetic paper strip welded to said top edges of said first and second sheets;
at least one window through said first sheet exposing at least one area of said synthetic paper strip in respective positional association with said at least one pocket; and
at least one window through said second sheet exposing at least one area of said synthetic paper strip in respective positional association with said at least one other pocket.

31. The album page according to claim 30, wherein:
said third sheet comprises a sheet of non-woven material.

32. The album page according to claim 30, wherein:
said height dimension of said synthetic paper strip is greater than the difference between the height dimension of said first sheet and the height dimension of said third sheet; and
said synthetic paper strip is welded along its bottom lengthwise edge to said top edge of said third sheet.

33. The album page according to claim 30, wherein:
said height dimension of said synthetic paper strip is less than the difference between the height dimension of said first sheet and the height dimension of said third sheet; and
said synthetic paper strip is welded along its bottom lengthwise edge to said first and second sheets.

34. The album page according to claim 30, wherein:
said windows through said first sheet are in superposed relation with said windows through such second sheet, respectively.

35. The album page according to claim 30, including:
weld-seals along said windows welding said synthetic paper strip to said first and second sheets.

* * * * *